United States Patent
Dadbakhsh (10) Patent No.: US 12,472,553 B2
(45) Date of Patent: Nov. 18, 2025

(54) SYSTEM AND METHOD FOR FORMING SINGLE CRYSTAL COMPONENTS USING ADDITIVE MANUFACTURING TOOLING

(71) Applicant: SingleX AB, Sundbyberg (SE)

(72) Inventor: Sasan Dadbakhsh, Sundbyberg (SE)

(73) Assignee: SingleX AB, Sundbyberg (SE)

( * ) Notice: Subject to any disclaimer, the term of this patent is extended or adjusted under 35 U.S.C. 154(b) by 0 days.

(21) Appl. No.: 18/554,495

(22) PCT Filed: Apr. 7, 2022

(86) PCT No.: PCT/EP2022/059343
§ 371 (c)(1),
(2) Date: Oct. 9, 2023

(87) PCT Pub. No.: WO2022/214630
PCT Pub. Date: Oct. 13, 2022

(65) Prior Publication Data
US 2024/0189896 A1 Jun. 13, 2024

(30) Foreign Application Priority Data

Apr. 10, 2021 (SE) .................... 2130099-1

(51) Int. Cl.
*B22D 27/04* (2006.01)
*B22F 10/20* (2021.01)
*B33Y 10/00* (2015.01)
*B33Y 40/20* (2020.01)

(52) U.S. Cl.
CPC ............ *B22D 27/045* (2013.01); *B22F 10/20* (2021.01); *B33Y 10/00* (2014.12); *B33Y 40/20* (2020.01)

(58) Field of Classification Search
CPC .............................. B22D 27/04; B22D 27/045
USPC ........................................... 164/122.1, 122.2
See application file for complete search history.

(56) References Cited

U.S. PATENT DOCUMENTS 5,518,061 A * 5/1996 Newkirk et al. ........ C04B 41/52
164/97
2016/0319677 A1 11/2016 McBrien et al.

FOREIGN PATENT DOCUMENTS

| CN | 111733451 A | 10/2020 |
| DE | 102019207553 A1 | 11/2020 |
| EP | 3281730 A1 | 2/2018 |
| EP | 3290135 A1 | 3/2018 |
| WO | 2014052323 A1 | 4/2014 |
| WO | 2018186849 A1 | 10/2018 |

OTHER PUBLICATIONS

International Search Report dated Aug. 9, 2022; Application No. PCT/EP2022/059343.

* cited by examiner

*Primary Examiner* — Kevin P Kerns
(74) *Attorney, Agent, or Firm* — DINSMORE & SHOHL LLP (57) ABSTRACT

A method of manufacturing a component includes the steps of: providing an additively manufactured component; providing a housing having the component; filling the housing having the component with a filler material for forming a mould of the component; and melting and cooling the component for forming a single-crystal microstructure of the component.

10 Claims, 5 Drawing Sheets

SYSTEM AND METHOD FOR FORMING SINGLE CRYSTAL COMPONENTS USING ADDITIVE MANUFACTURING TOOLING

CROSS-REFERENCE TO RELATED APPLICATIONS

This application is the U.S. National Stage of PCT/EP2022/059343 filed on Apr. 7, 2022, which claims priority to Sweden Patent Application 2130099-1 filed on Apr. 10, 2021, the entire content of both are incorporated herein by reference in their entirety.

FIELD OF THE INVENTION

The present disclosure relates to a manufacturing method and equipment for reprocessing an additively manufactured component.

BACKGROUND OF THE INVENTION

Additive manufacturing (AM) is a disruptive technology enabling new and complicated designs. The process flow is simple starting from a computer-aided design (CAD) file to the final part without any tooling. This minimises the need for machining, while it can maximise the geometrical complexity (e.g., interior and exterior holes and cooling channels) necessary for an improved performance. This is a huge opportunity to manufacture complex components, such as turbine blades. However, the performance of Additively Manufactured (AM) components, such as AM superalloy components, can be inferior especially at high temperatures.

The operating performance of the components is influenced from the selected manufacturing technique because the processing technique has a major influence on the performance via controlling/altering the microstructure of metallic components. The processing technology can generally change the grain structure and the corresponding grain boundaries. The grain boundaries cause cavitation and cracks (as potential failure initiation sites) in response to the perpendicular tensile stresses at higher temperatures and hence reduce the creep ductility. Complete elimination of grain boundaries by single crystal (SX) growth can maximise the mechanical and thermal properties of metal alloys.

However, due to the polycrystalline outcome of AM made alloys, the performance of AM components, can be inferior to the investment casting. This reduces the operating temperature and life of AM made alloys and consequently the sustainability of AM applications. Accordingly, it is not surprising that there is a serious wish to improve the AM sustainability to produce single-crystal components, despite this has been merely an almost impossible task so far.

SUMMARY OF THE INVENTION

Accordingly, it is an object of the present disclosure to provide a solution to the above-mentioned limitations in the state-of-art and solve drawbacks of AM components and provide a single-crystallised microstructure of additively manufactured parts.

The present disclosure relates in a first aspect to a method of manufacturing a superalloy component, the method comprising the steps of;
  providing an additively manufactured component,
  providing a housing having or containing the component,
  filling the housing having the component with a filler material for forming a mould of the component,
  melting and cooling the component for forming a single-crystal microstructure of the component.

This implies that the present approach envisions a post-processing (re-processing) method for an additively manufactured (AM) component. The AM component is provided within a housing, such as a container. The housing accommodating the AM component is filled with a filler material, such as a filler powder. Preferably, the filler material can be in the form of powder. Preferably, the powder can encapsulate the component from sides and until the top surface of the component. The component can be located in the housing so that there are voids, holes, and/or cavities below and/or around and/or within the component, and the component can be formed into a single-crystal microstructure of the component irrespective of the shape of the component. The filler material therefore can fill the voids, holes, internal and external cavities of the component. Filler material can be selected such that the filler material can act as a mould of the component. For example, the filler material can be a metallic and/or ceramic powder. Preferably, the filler material can be conductive and refractory powder. The powder can be sintered, such as by means of a heat source, such that a solid mass of powder can be obtained. Thus, the housing having the sintered powder can be perceived as an adaptive mould of the AM structure. If the different components differ from each other only by one two or three sides of the components and the other side(s) of the components is/are identical, the component can be located in the adaptive mould so that there are voids, holes, and/or cavities below and/or on those sides which differ form one component and another component. That may save filler material.

Consequently the component having an adaptive mould can be further processed by melting and cooling. Preferably, optimal parameters can be set to control melting and cooling of the component. Some important parameters may be geometry/size/volume of the part (component), the input energy, heat rate and superheat in conjunction with the cooling temperature and chilling rate. Advantageously, AM components can be post processed such that polycrystalline nature of the components are transformed to a singly crystal microstructure. Consequently, mechanical and thermal properties of the components can be enhanced.

The present approach relates in a second aspect to a single-crystal microstructure superalloy component manufactured by an additive manufacturing technique and post-processed by melting and directionally solidifying. Advantageously, the present approach can be used for various components having complex shapes, undercuts, internal holes and passageways. For example, the present approach can provide a turbine blade component. A great advantage of the present approach therefore is to offer a huge opportunity to manufacture complex parts such as turbine blades from hard and abrasive superalloys having single-crystal structure. Accordingly, the AM sustainability to produce superalloys by single crystallisation of the components can be improved. The parts can have improved thermal and mechanical properties at high temperatures while having a complex shape such as internal passageways by means of AM. The components can have the complex shape which are generally possible by means of AM process, in addition to improved properties such as higher creep resistance, thermal fatigue resistance and/or corrosion resistance.

The present approach relates in a third aspect to a module for additively manufacturing and reprocessing a component. The module comprises:

a printing unit comprising:
- a first housing for receiving a first metallic powder
- a first heat source configured to heat the first metallic powder to a first temperature for melting the first metallic powder,
- wherein the printing unit is configured to produce an additively manufactured component, a post-processing unit comprising:
- a second housing for receiving the additively manufactured component and a filler material for at least partly encapsulating the additively manufactured component,
- a second heat source configured to heat the filler material to a second temperature for forming a mould from the additively manufactured component, and configured to heat the additively manufactured component to a third temperature for melting the additively manufactured component, and
- a cooling unit configured to engage with and cool the second housing,
- wherein the module is configured such that the molten component is directionally solidified.

The present approach can therefore serve many solutions for providing AM components which can work effectively under high thermal and mechanical load.

Thus, the disclosed approach will drastically influence many industries, such as power and aerospace industries, by providing endurable and therefore sustainable components. The printing unit can be configured to print a component such that a heat source of the printing unit can scan powders in a predetermined direction such that powders are fused together along the predetermined direction. The post-processing unit can be configured to post-process the printed component. Alternatively, the post-processing unit can be configured to post-process any component.

Furthermore, the present approach can be applied to the defect parts, thereby contributing to reduce waste. Thus, the presently disclosed approach can upgrade infrastructure and retrofit industries to make them sustainable, with increased resource-use efficiency and greater adoption of clean and environmentally sound technologies and industrial processes. Another advantage of the present disclosure may be upgrading the technological capabilities. Yet a further advantage can be improving substantially by reducing waste generation through prevention, reduction, recycling and reuse. A further advantage of the present approach can be strengthening resilience and adaptive capacity to climate-related hazards and natural disasters.

The present approach relates in a fourth aspect to a post-processing unit as described above. The post processing unit comprises a housing for receiving a component. The component can be an additively manufactured component, alternatively, the component can be any component manufactured by casting or forming techniques. Advantageously, components manufactured by different and/or same techniques can be post-processed according to the presently disclosed approach.

BRIEF DESCRIPTION OF THE DRAWINGS

The invention will in the following be described in greater detail with reference to the accompanying drawings.

DETAILED DESCRIPTION OF THE INVENTION

The present disclosure can resolve several challenges related to the performance of AM components, especially at elevated temperatures.

In general, superalloy components have been a key player in applications at elevated temperatures, since superalloys can possess much higher creep resistance and stress-rupture resistance at high temperature, compared to other alloys. As used herein, superalloy refers to alloys that are used in high-temperature applications.

Superalloys can be complex alloys typically containing five to ten elements. Based on their composition, they can be classified into i) nickel-based, ii) iron-based and iii) cobalt-based superalloys. Superalloys can be commonly utilised in gas turbines and aircraft jet engines where the environmental temperatures can reach to 1300° C. Because superalloys generally work under high operating temperatures, superalloys can provide high temperature fatigue, creep, and corrosion resistant. Increasing such properties can be vital for example for engine power improvements for allowing a higher sustainability by a longer life, a better engine efficiency and a less fuel consumption.

Superalloys typically can have a composite matrix. This may be composed of an austenitic FCC solid solution, called gamma ($\gamma$), embedding numerous secondary phases. The secondary particles could be coherent gamma prime ($\gamma'$) as ordered FCC Ni3(Al, Ti, Ta), coherent metastable $\gamma''$ with body-cantered tetragonal (BCT) structure from Ni3Nb (transforming to $\delta$ in equilibrium state), carbides/borides, and/or topologically close-packed (TCP) phases.

Beside composition, the processing technique can have a major influence on the operating performance of the superalloys via controlling and/or altering the microstructure. For example, processing technology can change the grain structure and the corresponding grain boundaries in superalloys. The grain boundaries can cause cavitation and cracks (as potential failure initiation sites) in response to the perpendicular tensile stresses at higher temperatures and hence can reduce the creep ductility. Advantageously, complete elimination of grain boundaries by single crystal (SX) growth in superalloys can maximise the creep resistance. In addition, having no grain boundaries can discard the need for strengthening elements, such as C and Hf redundant.

Although various methods of casting, wrought and powder metallurgy technologies are applicable to manufacture polycrystalline superalloys, only a very controlled investment casting technique can be used to manufacture SX superalloys. The microstructures of superalloys during SX solidification may be controlled by various thermodynamic and kinetic constraints; however, even when solidification conditions are controlled, there may be a risk of defect formation.

Due to the production restrictions, SX blades can be mainly used for the most demanding dynamic/static parts at the highest temperatures where their application can no longer be avoided. Because turbine blades are common components in jet engines that are designed to operate at high temperatures. The higher the operating temperature, one can design the jet engines with higher take-off trust, leading to significant fuel reduction over years of operation. For such developments, superalloys have been a key player since they possess much higher creep resistance and stress-rupture resistance at high temperature, compared to other alloys.

In an embodiment, the component is a superalloy. In a further embodiment, the superalloy material is selected from the group comprising nickel based superalloy, cobalt based superalloy, iron based superalloy, and mixture thereof.

SX production through investment casting is cumbersome, and limited to design constraints of casting. AM on the other hand can provide a rapid production with an improved flexibility around the design of the component. The presently disclosed approach can therefore offer a solution for the improvement of the AM superalloy components.

From one aspect, the present approach can serve as a post-processing technique after manufacturing a component by means of AM technology. Thus, the present disclosure can resolve several important challenges that may be faced due to manufacturing via AM, especially AM of superalloys via AM. These challenges can be:

Polycrystalline nature of superalloys after AM: For the case of superalloys, having a singly crystal microstructure is extremely beneficial since it generates a maximum resistance to creep deformation. However, the polycrystalline grain structure of metal AM is rather inevitable since it generates i) a local melting of each spot and ii) a rapid solidification. With the presently disclosed approach, the AM superalloy parts can be post processed by remelting and cooling. Advantageously, remelting and cooling can be performed after manufacturing the component additively, using the available AM equipment itself. Thus, from one aspect, one of the principle theory of this disclosure can be based on remelting the 3D superalloy parts after AM using the available AM equipment itself. The proposed method is composed of several phases, while each phase can consist of several compulsory or complementary steps as described hereby.

Low material weldability: Since AM can be described as a repetitive welding process, it is susceptible to the formation of weld-cracking defects. Therefore, metal AM is commonly applied to metals with high weldability such as Inconel™ 718 (IN718). Low-weldability appears as defects such as porosity and cracking. Porosity in the AM of Ni-based superalloys is predominantly process-induced, but cracking varies more with the composition (i.e., low weldability) or the thermal stresses from the rapid solidification.

Residual stress: Laser based AM processes (SLML, PBF, DED, etc) are known to introduce large amounts of residual stresses. The residual stress originates partly from the cooling and shrinkage of the newly molten layer and partly from strain-induced stresses in the solid layers on the substrate underneath the newly applied layer. The residual stresses can lead to premature failure or can even deform or crack the superalloy part after manufacturing.

Crystallographic and microstructural heterogeneity: The crystallographic and microstructural heterogeneity could exist in AM partly due to local process changes and partly due to different temperature distribution at different locations.

Anisotropy: Due to the directional heat transfer and melting/solidification, a degree of anisotropy can appear in AM made superalloys.

In order to overcome these challenges and allow the AM component or superalloy component to can reach SX high performance parts, the following steps can be performed. Firstly, an AM component is provided within a housing. The housing is filled with a filler material. In an embodiment, the filler material is in the form of powder. In an embodiment, the filler material is of a refractory and/or conductive material. This implies that the powder can be a refractory and conductive powder. In a further embodiment, the powder is selected from the group comprising Molybdenum (Mo), Tantalum (Ta), Silicon Carbide (SiC), Tungsten Carbide (WC), Graphite (C), Tungsten (W), and mixtures thereof.

Thus, the housing and the powder pool surrounding the component can be perceived as a mould, such as an adaptable mould. An adaptable mould in the shape of a container having the housing and the powder may be necessary to replicate complex shapes.

Preferably, the refractory and conductive powder may be tungsten (W). This implies that W can be used to create a pool and encapsulate the shape of the AM component. Advantageously, W powder can have a melting point of 3422° C. and hence can reach a very high temperature (as high as 1600° C.) without melting. To endorse such heated W powder pool, a housing can be made from insulating refractory ceramics in the shape of thick tubes.

In an embodiment, the housing is made of a ceramic material. Furthermore, the wall thicknesses of the housing can be over 3 cm, and the material can be ZrO2. ZrO2 can be a very good material option for having a fair price along with desirable properties such as a high melting/softening point (2715° C./2010° C.), low thermal conductivity (2.5 W/m·K), and good stability at very high temperatures. Using ZrO2, the wall thicknesses for instance could be over 3 cm to fully insulate the input heat. W powder preferably does not melt thereby wear may be minimized. The housing can be designed to be easily mountable and dismountable. It should also be mentioned that a thick tube shape can be optionally selected to provide a homogenous temperature distribution by avoiding sharp edges.

After AM, the superalloy or the metallic component or part can be endorsed by the refractory insulation in the shape of rings or similar. As a good option, Tungsten (W) powder can be poured to make a powder pool. The powder pool can be until only the top surface or above the component. Advantageously, the powder can be spherical. Because spherical powders can maximise the powder flow and at the same time can minimise the sintering strength. For example, too much W powder contact might lead to W powder cake with a strength that might no longer be recoverable (be shattered to forming particles).

Appropriate sintering of the powder, such as W powder, embedding the superalloy AM part can be an important task since i) sintering can be necessary to bind the powder in order to prevent smoking after exposure to EB, ii) sintering can be necessary to hold the 3D shape of the superalloy part after melting at higher temperatures, iii) sintering can be necessary to have a homogenous distribution of the temperature in the part and particularly near the edges, iv) sintering should be kept minimised to allow powder recovery and releasing the part from the sintered powder pool. Therefore, a protocol to quantify desirable low-pressure sintering for such a case should be defined. The powder pool sintering degree may depend on the temperature, but the temperature depends on the superalloy being single crystallised. Therefore, to keep the sintering degree at an optimal degree, the powder itself can be modified. This can be performed by changing the size and composition of the powders. Some options may be: larger particles to reduce the sintering degree, coating via powder oxidation or nitridation (via heating in furnace), coating with carbon black (via mechanical blending), etc.

In an embodiment, the method comprises the step of sintering the powder. In a further embodiment, the powder is sintered by a beam source or a laser source. Sintering of the filler material may be provided simultaneously while melting the component.

After (or during) material sintering, optimal parameter set can be found to control material melting, and more importantly material cooling. Many parameters can be optimised after illustrating their influence one by one. Some important parameters may for example be geometry/size/volume of the part, the beam speed, the area of the scanning, the strategy and energy of scanning, and the rate of heating. The input energy, heat rate and superheat in conjunction with the cooling temperature and chilling rate is are another consideration. In an embodiment therefore, the cooling of the component is gradually controlled.

In an embodiment, the component is melted by a beam source or a laser source. The melting may be conducted by an electron beam source or a laser beam source. The beam source used for the sintering may be same beam source used for melting the AM component. Alternatively, sintering and melting may be performed by means of different beam sources or different heat sources. The design and number of the heat sources may be decided based on the cost and efficiency. In an alternative embodiment, the powder is sintered by a furnace, such as an induction furnace.

In an embodiment, the melting and cooling of the component is in accordance with the directional solidification technique. As used hereto, directional solidification refers to solidification that occurs from farthest end of the heat source and works its way towards the direction of the heat source. Accordingly, the cooling of the component can require a further attention such that gradually controlling the cooling rate for the component to reach SX microstructure. Thus, in a further embodiment, the method comprises the step of directionally solidifying the material such that a single crystal microstructure is obtained.

In an advantageous embodiment, the method comprises the step of monitoring the temperature of the housing and/or the components and/or the powder. This foresees that the method can comprise monitoring temperatures at different positions. This may be performed by means of thermometers. The temperature sensors can be contact sensors. The temperature sensors can also be non-contact sensors, such as infrared thermal camera. Preferably, temperature sensors are configured to monitor the temperature of the components. More preferably, the temperature at the lower end (close to the housing bottom) of the component and at the upper end of the component can be monitored. In a further embodiment, one or more thermometers, such as thermocouples can be provided to acquire the temperature of the cooling unit.

In an embodiment, the method comprises the step of additively manufacturing the component manufactured by means of a non-beam source melting process, such as binder jetting or material extrusion method.

In an embodiment, the method comprises the step of additively manufacturing the component by means of a beam source melting process, such as electron beam melting. In one embodiment, the beam source of the beam source melting process is an electron beam. In one embodiment, the beam source of the beam source melting process is a laser beam. In an embodiment, the method comprises the step of additively manufacturing the component by a heat source and further melting the component by said heat source.

Furthermore, in an embodiment, the method comprises the step of removing the component from the mould. To bring the SX part outside the powder pool, a commercial powder recovery system (RPS) can be used. This may be a blasting stage with the similar powder, similar to the filling powder, and is commonly used to recover the part from the powder cake (sintered powder) after EB-PBF.

The pores and cracks that may be developed during development of AM superalloys can cause defect parts, which can impose a great material, labour, energy and hence cost waste. The present approach can offer a solution to repair such defects as the approach can be applied as re-melting the AM superalloy components as a whole and cooling it down under a controlled condition. Thus, the present approach can reconsolidate and annihilate the formed porosity and cracks, expanding the application area to the AM and hard-to-AM components, such as nickel based superalloys.

While AM manufacturing of many high performance superalloys may be limited due to their low weldability, the presently disclosed approach can resolve the poor welding and cracks by a controlled remelting of the whole material; thus, the approach can be applied to a variety of superalloys, such as Ni-based superalloys.

Furthermore, the present approach can provide a component for a gas turbine manufactured by a method according to any one of the above described embodiments.

Additionally, the present approach relates to a single-crystal microstructure superalloy component manufactured by an additive manufacturing technique and post-processed by melting and directionally solidifying. In an embodiment, the single-crystal microstructure component has internal passageways. In a further embodiment, the components is a turbine blade. Advantageously, the performance of the components made via additive manufacturing (AM) can be enhanced.

As described above, the present disclosure further relates to a module for additively manufacturing and reprocessing a component. The module can comprise a first housing for receiving a first metallic powder. The first metallic powder is used for additively manufacturing the component by means of a first heat source such that the heat source can be configured to heat the first metallic powder to a first temperature for melting the first metallic powder.

The module can comprise a second housing for receiving the additively manufactured component and a filler material. In an advantageous embodiment, the first and/or the second housing are refractory ceramics.

In an embodiment, the first and/or the second housing are the same housings. This implies that after additively manufacturing the component by the first metallic powder, the housing can be vacuumed to remove the rest of the first metallic powder and further provided with the filler material.

In an embodiment, the filler material is at least a second metallic powder. In a further embodiment, the second heat source is configured to heat the second metallic powder to a second temperature for sintering the second metallic powder. In an embodiment, the first and/or the second are the same energy sources.

In an embodiment, the second heat source comprises two second heat sources configured to heat the filler material to a second temperature for forming a mould from the additively manufactured component, and to heat the additively manufactured component to a third temperature for melting the additively manufactured component, respectively. In an embodiment, the third temperature is below the melting temperature of the filler material. In an embodiment, the second temperature is below the melting temperature of the filler material.

In an embodiment, the module further comprises a protective sheet between the first housing and the first heat source, and/or between the second housing and the second heat source.

Similar to what was described previously, the melting of the additively manufactured component and cooling of the second housing can be in accordance with the directional solidification technique.

Preferably, cooling can be provided by means of a contact cooling unit, designed to be (de)mountable and can control the cooling rates in a desired direction. To control the temperature of the cooling unit, a fluid circulating system can be used. In an embodiment therefore, the cooling unit comprises an engagement plate, such as a heat sink for engaging with the bottom of the housing and a fluid circulating system. The used fluid may depend on the required cooling efficiency. The cooling unit may comprise gas or liquid within the circulating system. For example, copper can be used to maximise cooling efficiency. Alternatively, any other material with high conductivity and high melting point can also be used. To implement directional cooling, an intermediate contacting part can be designed as a heat sink. For example, graphite can be used as a heat sink due to its high conductivity and high melting point. When a metal heat sink is used, it may be advantageous to spray and/or coat the metal heat sink by graphite before the application to prevent welding and strong attachment.

In an advantageous embodiment, the module comprises a sensing unit, such as one or more position sensors for determining the position of the cooling unit and one or more thermocouples for determining the temperature of the component. The position sensors can be placed anywhere in a frame to monitor the position of the cooling unit and/or the housing and/or the adaptive mould and or the component such that the directional cooling can be improved and controlled. This implies that the sensing unit can be configured to detect an engagement of the cooling unit with the housing having the components such that the directional cooling can be controlled.

Finally, it is worth to mention that the module can be configured to perform the above-described method. In addition to the printing and post processing module, hereby disclosed invention can also relate to a post-processing unit according to the present disclosure.

DETAILED DESCRIPTION OF THE DRAWINGS

The present disclosure will now be described more fully hereinafter with reference to the accompanying exemplary embodiments shown in the drawings when applicable. However, it is to be noted that the presently disclosed system and method may be embodied in various forms. The hereby provided embodiments are to guide a thorough and complete disclosure. Hence, embodiments set forth herein should not be interpreted as limiting but be construed as a tool for delivering the scope of the invention to those who are skilled in the art. Same reference numbers refers to the same element throughout the document.

Figure 1:
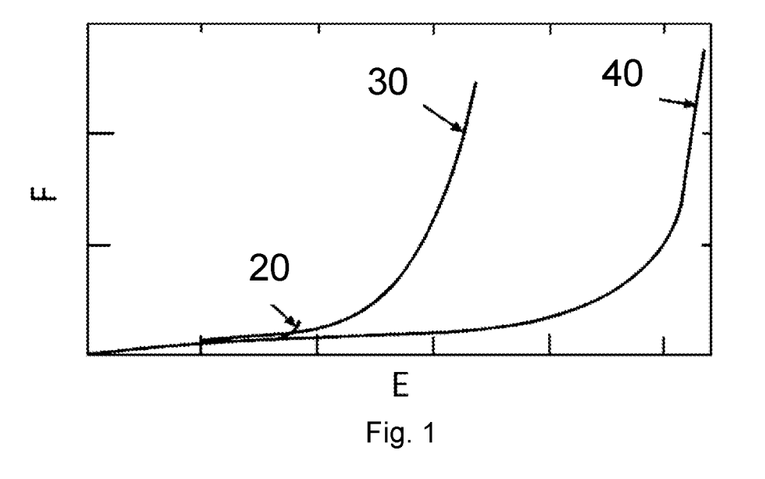
FIG. 1 shows an example of a creep strain vs time curve.

As described here-above, beside the composition, the processing technique can have a major influence on the operating performance of the superalloys via controlling/altering the microstructure. FIG. 1 shows a typical creep strain (F) vs time (E) for the conventionally cast with equiaxed grains 20, for the directionally solidified with columnar grains 30 and for the single-crystal superalloys 40. The graph is inspired from the Mar-M200 superalloy under loading of 206 MPa and 982° C. Accordingly, as seen from FIG. 1, directionally solidified (DS) structures can develop preferential grain structures with columnar grains 30 and textures to delay thermal failures compared to conventionally casted structures with equiaxed grains 20. More radically, complete elimination of grain boundaries by single crystal (SX) growth in superalloys 40 can maximise the creep resistance.

Figure 2:
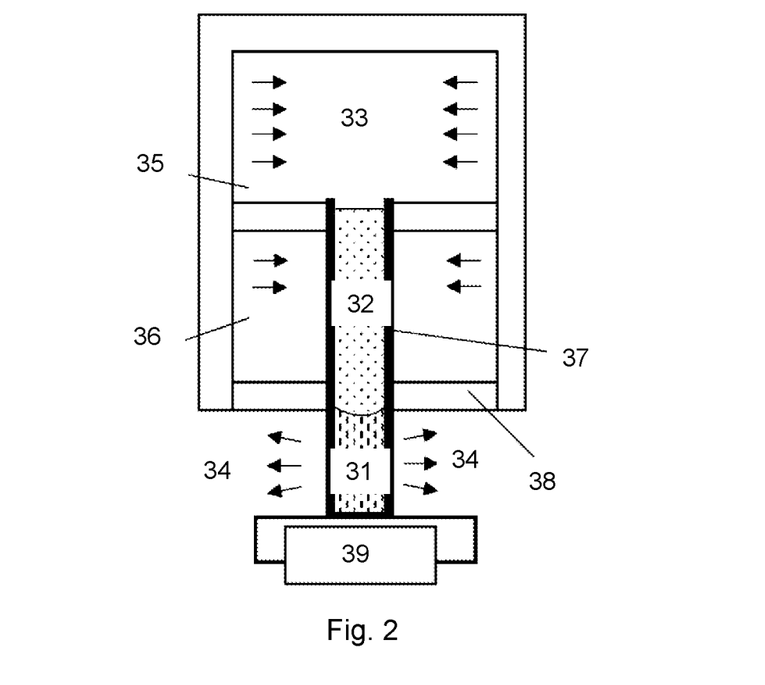
FIG. 2 shows an illustration of Bridgman casting process.

Generally, the microstructures in Ni-base superalloys during SX solidification is controlled by various thermodynamic and kinetic constraints. High contents of refractory elements (e.g. Re, W and Ta) promote segregation during solidification, which results in heterogeneous microstructures. Even when solidification conditions are precisely controlled, there is a risk of defect formation. As a result, SX production of superalloys is only possible through casting via extreme control of directional solidification. This is commonly performed based on the 'Bridgman' method, schematically shown in FIG. 2. The Bridgman casting process comprises a solid metal 31, liquid metal 32, heat radiation 33, cold zone 34, upper hot zone 35, lower hot zone 36, mould 37, baffle 38, and chill plate 39. In this method, casting is directed from the hot zone 35 to the cold zone 34 through the baffle 38 with a certain rate in directional solidification, while the mushy zone is located near the baffle 38. In this technique, heat is irradiated into the hot zone 36 above the baffle 38 and extracted from the casting in the cold zone 34 below the baffle 38.

Although various methods of casting, wrought and powder metallurgy technologies may be applicable to manufacture polycrystalline superalloys, only a very controlled investment casting technique is currently used to manufacture SX superalloys. An alternative to manufacture SX superalloys can be to post process an additively manufactured superalloy according to the presently disclosed approach. The present section will now discuss various existing additive manufacturing techniques to manufacture a component, which can be post-processed according to the hereby disclosed approach.

Additive manufacturing (AM) is a disruptive technology offering new design and manufacturing possibilities. AM minimises very abrasive and difficult machining needs, while it can maximise the geometrical complexity (e.g., interior and exterior holes and cooling channels) necessary for an improved performance. According to this simplicity against the difficulties of conventionally fabricated complex components (such as turbine blades), AM is increasingly used to manufacture superalloys particularly from Ni-based family.

One AM technique to fabricate complex metal component, such as superalloys, can be laser powder bed fusion (LPBF) or selective laser melting (SLM). This process uses a laser to melt and consequently solidify three-dimensional parts from metal powders, layer-by-layer from cross section slices of a CAD model.

Electron beam powder bed fusion (EB-PBF) or electron beam melting (EBM) can be another AM method to manufacture superalloy components. EB-PBF is a powder bed AM process, and uses a high energy electron beam (EB) in a vacuum atmosphere to manufacture dense and complex parts. The EB-PBF system is composed of an electron beam unit and a build chamber. The high preheating temperatures to process superalloys in EB-PBF can be an advantage, despite it roughens the surfaces. This relieves the residual stresses, mitigates the cracks and deflections, and coarsens the grain structure. The larger grain structures after EB-PBF of superalloys can also improve creep resistance compared to the SLM LPBF parts. However, this may not yet reach the creep resistance of conventionally made casting parts.

Direct energy deposition (DED) or laser metal deposition (LMD) can be other methods to manufacture AM parts from metal powders or wires. In this process, successive layers of powders or wires are fed through a nozzle (or several nozzles) onto the build surface, where the powder is melted upon laser exposure. Some other methods for manufacturing the AM component may be metal FDM and binder jetting.

Polycrystalline AM microstructure can result in a worsened properties, such as the material creep and thermal fatigue resistance, particularly in comparison with advanced modified directional solidification casting which is able to induce only one single crystal (SX) in superalloys. A post processing method, as disclosed by the present approach, can enhance the mechanical and thermal properties of AM components.

Figure 3:
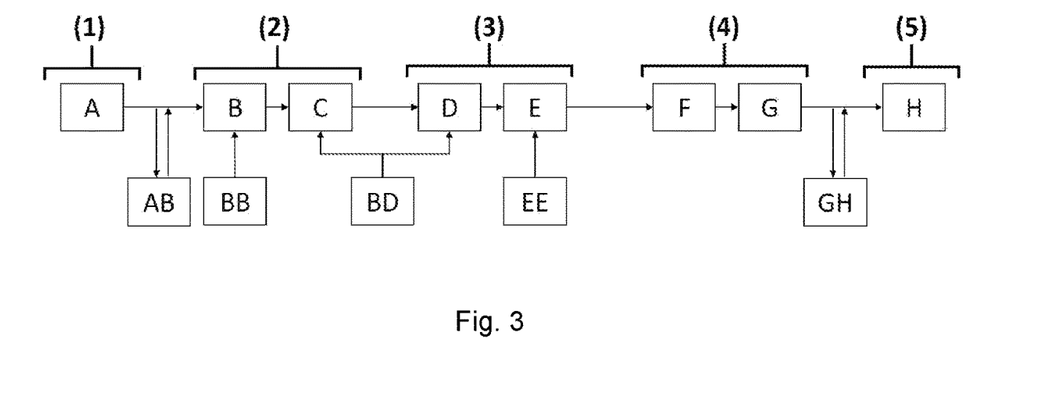
FIG. 3 shows an embodiment of the steps according to the presently disclosed method.

FIG. 3 shows an embodiment of the steps of the hereby disclosed method. The method can be applied to modify AM superalloys to reach SX high performance parts. Stage (1) is AM part provision, stage (2) represents housing according to the SX processing requirements, stage (3) is SX treatment, stage (4) is part recovery and stage (5) is the final SX part. The first stage, stage (1) is the provision A of AM of superalloy part. The AM superalloy part can be any component that has been additively manufactured. In stage (2), the AM superalloy part is placed B in a housing, wherein the housing is filled with refractory and conductive powder. The powder is controllably heated and sintered C, such that the sintered powder and the housing can form a mould for the AM superalloy part. The process continues with controllably melting D and directionally cooling E the AM superalloy part. In step (4) the housing is opened F and the components is recovered G from sintered powder. Finally, the superalloy part can be further used H for analysis and/or application. Some other advantages stages may for example be coating AB of AM part, modifying BB refractory and conductive powder before providing it to the housing, monitoring BD heating and EE cooling, post treatment GH.

Figure 4:
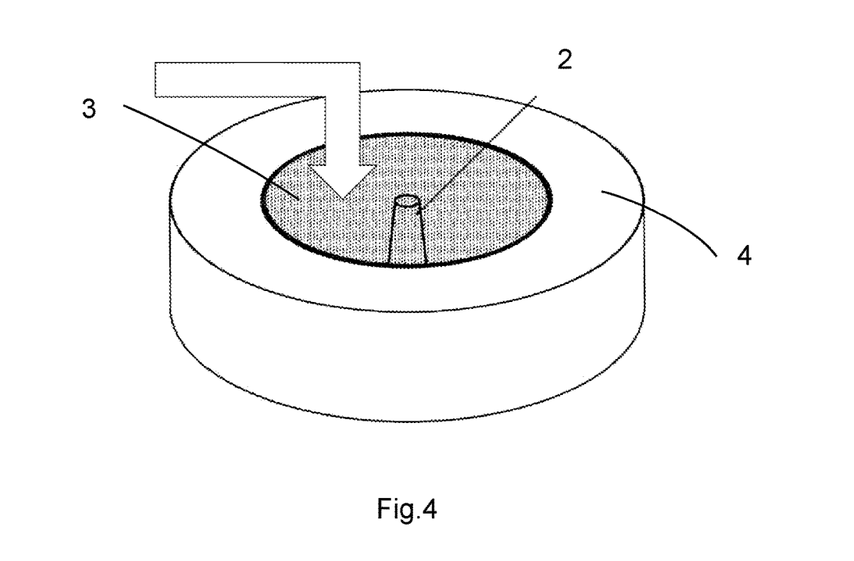
FIG. 4 shows an embodiment of the housing having the component.

FIG. 4. shows an embodiment of the parts for making a mould. The complex superalloy part 2 located in the refractory insulation housing 4, and refractory conductive powder 3, such as W powder, surrounds the superalloy part 2. The powder 3 further fills the holes and voids within the part 2 such that when the powder 3 is sintered or partly or fully solidified, the housing and the sintered powder can be a mould.

The presently disclosed approach requires a strong source of directional energy. Ultra-powerful lasers can be an option. Alternatively, electron beam can be the source of energy. Electron beam can be a more cost effective option which can provide abundant energy (such as 10 kW and 12 kW beam energy). Generally, the electron beam can be generated with higher efficiency (typically over 80-90%) than lasers and can be a flexible option to provide a uniform heating from the top, as the beam can scan the required surfaces with extremely high speed (for example, 20,000 mm/s can be reachable which can theoretically scan a 20 cm×20 cm surface in 0.1 s if the scan line spacing is 2 mm).

Figure 5:
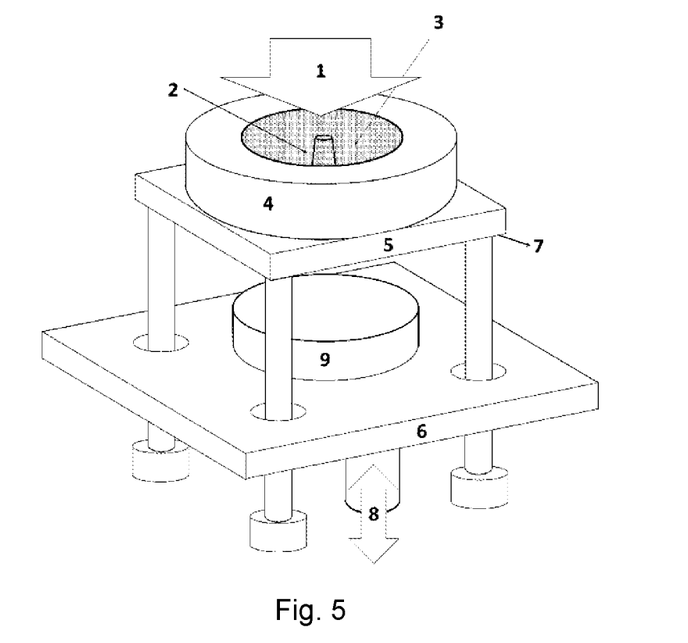
FIG. 5 shows one embodiment of a single crystallising module.
Figure 6:
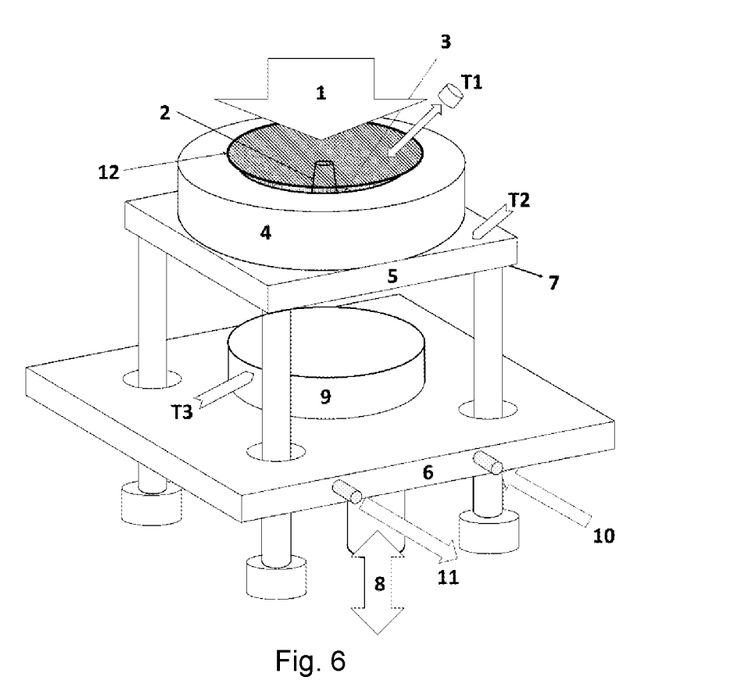
FIG. 6 shows one embodiment of a single crystallising module.

FIG. 5 shows one embodiment of a module which may be used for performing the steps of the disclosed approach. The module comprises a high energy beam 1, embedded part 2, refractory and conductive powder 3, refractory insulation housing 4, refractory metal baseplate 5, controllable cooling managing plate 6, grounding from several places 7, movable table 8, and heat sink 9. Additionally, FIG. 6 shows one embodiment of the module having further advantageous units such as cooling inlet 10, cooling outlet 11, smoke protective refractory metal sheet 12, thermometers (T1-T3) at several places.

Accordingly, the module comprises a heating-unit, a base unit, a contact-cooling unit, and a sensing system, which are described further below.

- a heating-unit can provide exposure of large electron beam 1 energy from the top to powder and part.
- a base-unit, such as a base plate 5, can hold the part and powder upward. The base unit can be tough, electrically and thermally conductive, and able to resist high temperatures up to 1500° C. Therefore, for example Mo plate (2623° C.) can be used as the baseplate 5, supported by insulating bases to minimise loss of energy and grounding to prevent smoking.
- a contact-cooling unit, is designed to be separable and can control the cooling rates in a desired direction. To control the temperature of the cooling unit, the cooling unit can be cooled down by a fluid circulating system 10, 11 as shown in FIG. 6. To implement directional cooling, an intermediate contacting part can be designed as a heat sink 9.
- a sensing system T1, T2, T3 as shown in FIG. 6 to monitor the temperature and the process at different positions. This can be mainly composed of thermometers (such as infrared temperature sensor and thermocouples) and position sensors (e.g. contact sensor to realise when the heat sink 9 is 'connected/disconnected' to the base plate 5).
- an optional smoke protective refractory metal sheet 12 since the powder can metallise, spatter, or even suddenly scatter (due to electrostatic repulsive charges from electrons) if they are directly exposed to the high EB energy. In these cases, an optional smoke protective metal sheet 12 or a medium, for example from tungsten metal sheet or similar, can be used on top of the powder to convert the EB energy to heat. The heat then can be uniformly conducted and radiated, to the underneath powder.

Furthermore, the module can be upgraded for i) to ground the electrons, ii) to insulate the powder pool, comprising the housing filled with powder, and the part, iii) to control heating/cooling, iv) to monitor the temperatures, and v) to change the heating mode from direct electron impact to conduction and heat radiation.

Thermal Analysis and Simulation

In an example, according to some theoretical and background calculations, without considering the energy required to heat the Mo plates, to melt 2 cm×2 cm×10 cm IN718 embedded in 50% packed W powder pool (10 cm height) with a superheat of about 200° C. to 1773K in a housing with 10 cm diameter, a magnitude of 2098.7 kJ is necessary. Even with considering 50% heat loss (from radiation and conduction), this can be provided using a 60 kV electron beam gun with a current of 100 mA (i.e., 6 kW source of energy) around 12 min. This can be a good example that remelting and single crystallisation could be extended to large sizes (e.g., 10 cm×10 cm×20 cm) but after providing adequate energy and time.

Below calculations demonstrate in more details that how a commonly available 6 kW source of energy can melt a superalloy part, as mentioned above in 12 min:

$T_m$ of IN718=1260–1336° C.~1300° C.=1573 K; $m_{(IN718)}$=328 g; $m_{(w)}$=7193 g:

$C_{p,W}$=23.807+3.264×10$^{-3}$×$T$ J/g·mol·K; $C_{p,IN718,solid}$= (0.2$T$+303.4)$_{293}^{373}$+(0.22$T$+295.94)$_{373}^{473}$+ (0.06$T$+371.62)$_{473}^{673}$+(0.24$T$+250.48)$_{673}^{873}$+ (3.065$T$−2215.75)$_{873}^{1073}$+($T$)$_{1073}^{1573}$ J/kg·K $\Delta H_{IN718,s \to l}$=227 KJ/kg[17]; Assuming $C_{p,l}$=1573 J/kg·K $Q$=($Q_W$)$_{293}^{1773}$+($Q_{IN718}$)$_{293}^{1773}$=$Q_{W,293 \to 1773}$+ $Q_{IN718,293 \to 1573}$+latent heat of IN718+ $Q_{IN718,1573 \to 1773}$ $Q$=($m_{(W)}$×$\int_{293}^{1773}$CpdT)$_W$+($m_{(IN718)}$×($\int_{298}^{1571}$CpdT+ $\Delta H$(IN718)+$\int_{1571}^{1773}$Cp(liquid)$dT$))$_{IN718}$ $Q$=1574.9 kJ+345 kJ+74.5 kJ+109.7 kJ=2104.5 kJ, assuming 50% heat loss→$Q$=4209 kJ→6 KW electron beam energy 702 sec~12 min.

Figure 7:
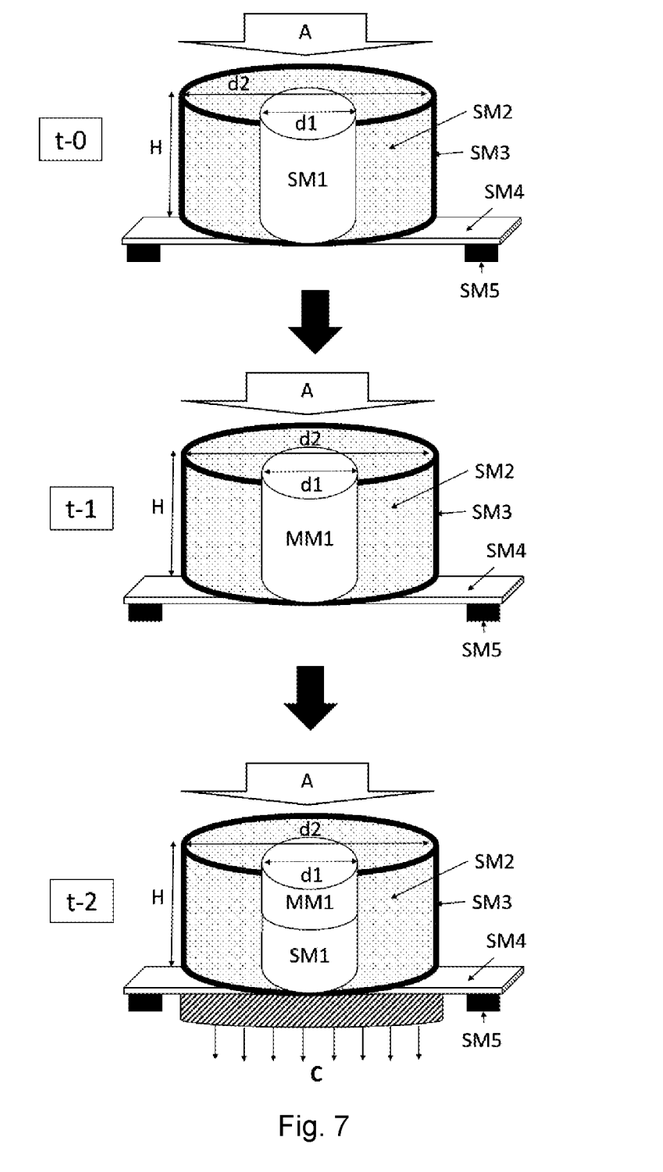
FIG. 7 shows an illustration of the housing having the component at various time-steps.

The problem above can be expanded and solved using simulation studies (via any simulation software, such as ANSYS in this case). FIG. 7 shows an illustration of housing and process parameters for an exemplary simulation problem of the present approach. (t-0) is the starting time, (t-1) is when the material fully melts, (t-2) is when liquid and solid meets at half. (A) is the source of energy, (d1) diameter of the cylinder part, (d2) inner diameter of the housing, (H) height of the housing as well as the cylinder, (SM1) solid superalloy material, (SM2) solid refractory and conductive powder, (SM3) refractory insulation material, (SM4) refractory thin metal plate, (SM5) refractory insulation material, (C) heat sink for cooling, and (MM1) molten superalloy material.

At 't-0', 6 kW energy (FIG. 7, A) irradiated to the top surface of the solid IN718 superalloy part (FIG. 7, SM1), embedded in 50% tungsten powder (FIG. 7, SM2), increasing the top temperature to 1600° C. Afterwards, the A energy will be adjusted to keep the top surface at 1600° C. Considering perfect insulations and hence no conductivity to the surroundings (FIG. 7, SM3 and FIG. 7, SM5), no convection (the module exists in vacuum), and no radiation, the melting problem can be solved.

Figure 8:
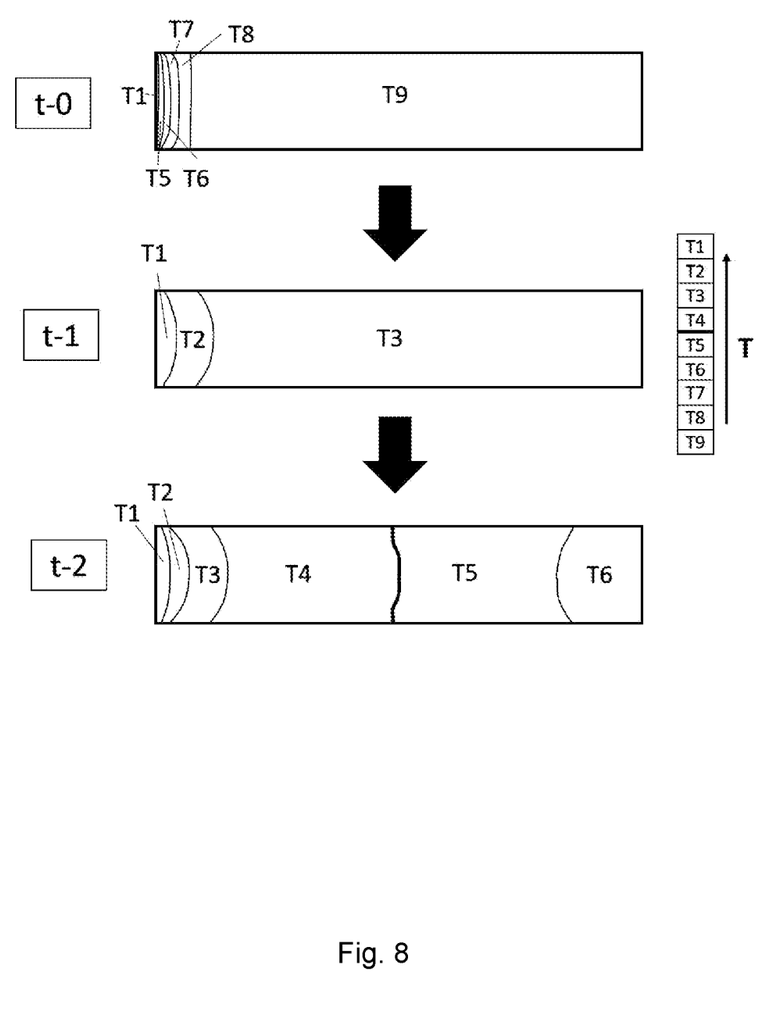
FIG. 8 shows an illustration of the temperature profile of the component at various time-steps.

FIG. 8 shows the results of the simulation performed according to the embodiment as described in FIG. 7. (t-0) is starting time, (t-1) is when the material fully melts, (t-2) is when liquid and solid meets in half and (T1) 1600-1532° C., (T2) 1532-1464° C., (T3) 1462-1396° C., (T4) 1396-1328° C., (T5) 1328-1260° C., (T6) 1260-952° C., (T7) 952-645° C., (T8) 645-337° C., (T9) 337-30° C. The melting supposedly occurs between T4 and T5 for the current example.

The solution would indicate full melting of the part occurs at t-1=13 min largely at the temperature of T3=1462-1396° ° C. above Tm of IN718=1260-1336° C. (FIG. 8.t-1).

The simulation shows that with continuation of energy input after 17 min, most of the component is molten at T2=1532-1464° C. At the minute of 18, the bottom surface comes in contact with a cold plate and cools down to 1000° C. Afterwards, simulation solves whether we can have solid superalloy material and molten superalloy material in balance at the time of 't-2' (FIG. 7.t-2). The solution predicts that this happens in 7 min at t-3=25 min, where an interface between T4 (1396-1328° C.) and T5 (1328-1260° C.) brings molten and solid superalloy together (FIG. 8.t-2). Accordingly, by controlling solid and molten liquid in a flat interface, as simulated above, the present approach can provide SX superalloy components.

Items

1. A method of manufacturing a superalloy component, comprising;
additively manufacture a structure of a component in a superalloy material
forming an adaptive, separable insulating housing
placing the component in the housing
filling the housing and gaps and hollow features with a refractory and conductive powder to enclose the component
exposing the powder in the housing to a beam source at high temperature to sinter
directionally melting the superalloy component using an beam source to form a single crystallisation microstructure within the component
cooling the component controlled and gradually in the housing
removing the sintered material from the component.
2. The method of item 1, wherein the step of directionally melting includes directionally solidifying the material to have a single crystal microstructure.
3. The method as recited in item 1 or 2, wherein the superalloy material is selected from the group consisting of a nickel based superalloy, cobalt based superalloy or iron based superalloy.
4. The method as recited in any preceding item, wherein the housing is manufactured of a ceramic material.
5. The method as recited in any preceding item, wherein the refractory and conductive powder consist of Molybdenum (Mo), Tantalum (Ta), Silicon Carbide (SiC), Graphite (C), Tungsten (W), or similar.
6. The method as recited in item 5, wherein the refractory and conductive powder is a mixture of at least two of the substances.
7. The method as recited in any preceding claim, wherein the structure of the component has been additively manufactured by a beam source melting technique.
8. The method as recited in item 7, wherein the beam source equipment used for melting and consequently directionally solidifying the superalloy component is the same as used when additively manufacturing the component in a superalloy material.
9. The method as recited in item 7 or 8, wherein the beam source is an electron beam.
10. The method as recited in item 7 or 8, wherein the beam source is a laser beam.
11. A component for a gas turbine engine comprising an additively manufactured superalloy component, said component having been solidified by a beam source melting equipment and directional remelted by the same beam source equipment.

The invention claimed is:

1. A method of manufacturing a single-crystal microstructure superalloy component, the method comprising the steps of:
providing an already manufactured component, wherein the component is formed entirely or partially by additive manufacturing,
providing a housing accommodating the component,
filling the housing accommodating the component with a filler material in a form of powder for forming a mould of the component, wherein the filler material has a different chemical composition than the component and is configured to form a mould of the component upon sintering,
melting and cooling the component for forming the single-crystal microstructure of the component, wherein the component is melted throughout its volume by exposure to an energy beam source.

2. The method according to claim 1, further comprising the step of removing the component from the mould.

3. The method according to claim 1, further comprising the step of sintering the powder by a furnace, an electron beam source, or a laser beam source.

4. The method according to claim 1, wherein the melting and cooling of the component is in accordance with a directional solidification technique.

5. The method according to claim 1, wherein the component is melted by an electron beam source or a laser source.

6. The method according to claim 1, further comprising the step of directionally solidifying the material such that a single crystal microstructure is obtained.

7. The method according to claim 1, wherein the filler material is of a refractory and/or conductive material.

8. The method according claim 1, wherein the powder is selected from the group consisting of Molybdenum (Mo), Tantalum (Ta), Silicon Carbide (SiC), Tungsten Carbide (WC), Graphite (C), Tungsten (W), and mixtures thereof.

9. The method according to claim 1, wherein at least a part of the filler material is recovered after use.

10. The method according to claim 9, the method further comprising the steps of:
manufacturing a second single-crystal microstructure superalloy component comprising the steps of:
providing a second already manufactured component, wherein the second component is formed entirely or partially by additive manufacturing,
providing the housing accommodating the second already manufactured component,
filling the housing accommodating the second already manufactured component with the recovered filler material in a form of powder for forming a second mould of the second already manufactured component, wherein the filler material has a different chemical composition than the second component and is configured to form a mould of the component upon sintering,
melting and cooling the second already manufactured component for forming the second single-crystal microstructure of the second additively manufactured component, wherein the component is melted throughout its volume by exposure to an energy beam source.

\* \* \* \* \*